Figure 1:
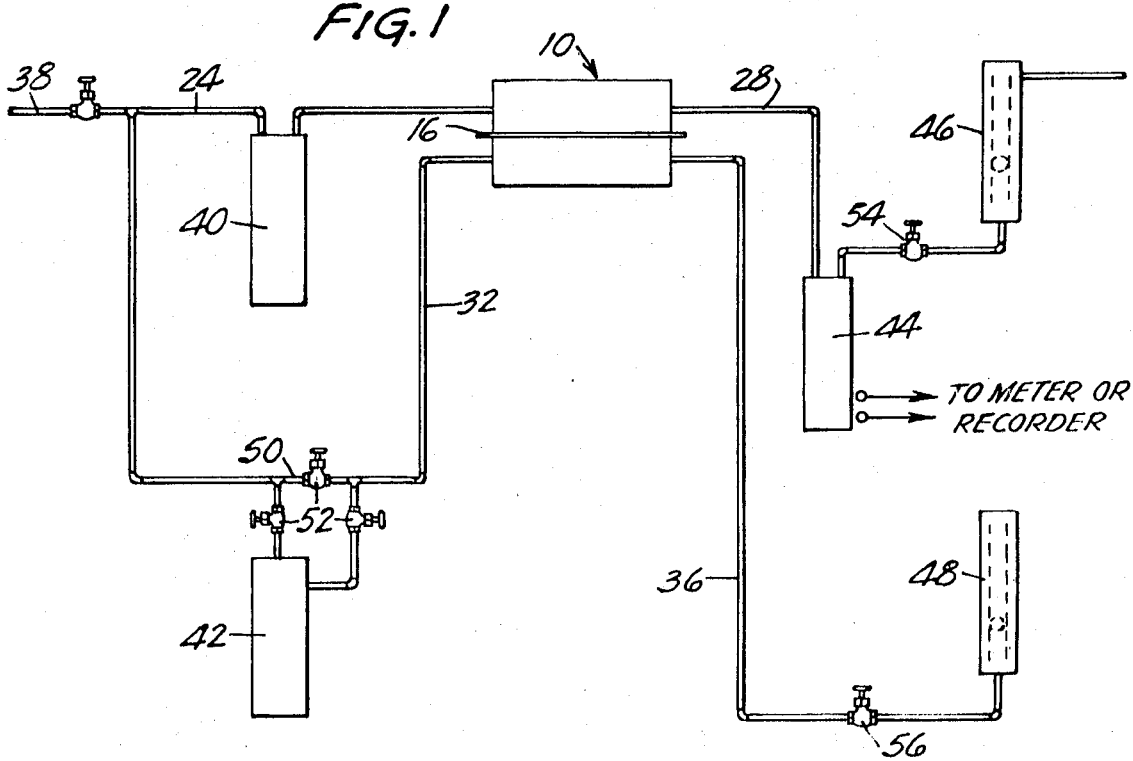

United States Patent

[11] 3,604,246

[72] Inventor Paul E. Toren
  Mahtomedi, Minn.
[21] Appl. No. 487,256
[22] Filed Sept. 14, 1965
[45] Patented Sept. 19, 1971
[73] Assignee Minnesota Mining and Manufacturing Company
  St. Paul, Minn.

[54] PERMEABILITY TESTING APPARATUS AND METHOD
  16 Claims, 2 Drawing Figs.
[52] U.S. Cl. .................................................. 73/38,
  55/16, 73/29
[51] Int. Cl. .................................................. G01m 3/16
[50] Field of Search ........................................ 73/38, 19,
  23, 29, 73; 55/158, 16; 210/23

[56] References Cited
UNITED STATES PATENTS
3,241,293  3/1966  Pfefferle ........................ 55/16

*Primary Examiner*—Jerry W. Myracle
*Attorney*—Kinney, Alexander, Sell, Steldt & DeLaHunt ABSTRACT: Apparatus for measuring the permeability of films by monitoring flowing gas streams contacting surfaces of the film, including a gastight cell consisting of a pair of cuplike sections adapted to clamp a sheet of film material tightly between them to hold it in gastight relationship to both of the sections, to form two compartments separated by the said film, means being provided so that a test gas flows through one of the compartments and sweep gas flows through the other compartment, the sweep gas being conveyed to a detector to determine the amount of test gas which is present because of having passed through the film. Bypass means is provided so that sweep gas can be passed through both chambers in order to establish a base line for improved accuracy in detecting very low rates of permeability.

PATENTED SEP 14 1971 3,604,246

INVENTOR.
PAUL E. TOREN
BY
Carpenter, Kinney & Coulter
ATTORNEYS

PERMEABILITY TESTING APPARATUS AND METHOD

This invention relates to a process for measuring the permeability of films to gases and vapors.

The ability of packaging films and other sealing films to resist gas and vapor inleak or escape is dependent on the permeability of the film material to the particular gas or vapor in question. For example, water vapor can be very damaging to numerous products and therefore it is very important to manufacturers of film for the packaging of such products to be able to test the water vapor permeability of the film material.

The standard method for measuring water vapor transmission is identified as ASTM E 96–53T. In this method either water or an efficient desiccant is placed in a vessel which is sealed with the film to be tested. The vessel is weighed and means are employed to control the humidity of the air or gas adjacent to the outer side of the film. For example, such humidity will generally be maintained at 0 percent when water is contained in the vessel and 100 percent when the vessel contains a desiccant. The difference in humidity that is thus established between the gases on either side of the film encourages a flow of water vapor through the film from the wet gas into the dry gas. Depending on whether the vessel contains water or desiccant, the weight of the vessel will either decrease or increase according to the amount of water that is transferred through the film. By determining the weight difference in a specified unit of time, the rate of water transmission through the film can be established. This rate is calculated in terms of grams of water per square meter per 24-hour period.

The above-described method, however, has only a very limited field of application. If the film to be tested has a very low water vapor transmission rate, the water that will transfer through the film within a reasonable time, e.g. 24 hours, is too small to be accurately measured. Furthermore, although there are numerous applications wherein it is desirable to determine the permeability of film materials to various gases, the above-described standard method is only applicable for determining water vapor transmission.

Even in the narrow field to which it is applicable, the standard method is unsatisfactory because of the time that is required to run the test. For example, a manufacturer of film may be required to meet certain water vapor permeability standards and therefore will test each run of material. The 24-hour period that is commonly required to make the test can be very expensive to the manufacturer in the form of waste material and time lost if a defect is found. Even if the run is found satisfactory, the inventory that is accumulated during the period as well as the delay in making shipments is costly to the manufacturer.

Accordingly there has existed in the industry for a number of years a need for a versatile testing means to quickly determine the various gas and vapor permeabilities of films. However, as far as I am aware, prior to my invention there has been no suggestion to the industry of a means such as is disclosed herein for satisfying this need.

In general, my invention comprises a gastight cell that is separated into two compartments by a sheet of the film material to be tested. Each compartment has a gas inlet and outlet. A test gas or vapor is circulated through one compartment and a sweep gas is circulated through the other compartment. A detector is positioned in the sweep gas exit line and functions to determine the quantity of test gas that is transferred through the film and into the sweep gas per unit of time.

Figure 2:
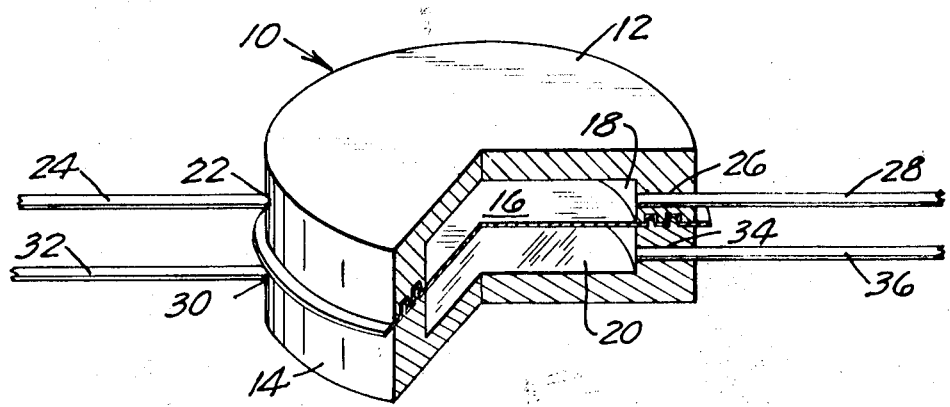

A number of advantages are realized by my novel testing apparatus. These will become apparent by reference to the following detailed description and to the drawing wherein:

FIG. 1 schematically illustrates an apparatus for testing water vapor transmission in accordance with my invention, and FIG. 2 illustrates a test cell as used in the apparatus of FIG. 1, shown partly in section.

Referring to FIG. 2 of the drawings, a test cell 10 has upper and lower sections 12 and 14. A sample film 16 is tightly clamped between the sections to separate the cell into upper and lower compartments 18 and 20. The upper compartment has an inlet 22 that is connected to a sweep inlet tube 24, and an outlet 26 that is connected to a sweep gas exhaust tube 28. The lower compartment has an inlet 30 that is connected to a test gas inlet tube 32 and an outlet 34 connected to a test gas exhaust tube 36.

Referring to FIG. 1 of the drawings, the sweep gas inlet tube 24 is connected to a gas source 38 and includes a gas drying cell 40. The test gas inlet tube is connected to the gas source 38 and includes a gas saturator element 42. The sweep gas exhaust tube 28 is provided with a detecting element 44, for example, an electrolytic measuring cell, to detect the amount of test gas within said sweep gas exhaust.

In operation, gas is introduced into the system from the gas source 38 and directed through tubes 24 and 32. The gas directed through tube 24 is passed through the gas drying cell 40 to remove all moisture from the gas and is passed into the upper section 18 of the water vapor transmission cell 10 as a sweep gas. The gas directed through tube 32 is passed through the gas saturator element 42 to provide the gas with 100 percent humidity and then is passed as a test gas into the lower section 20 of the water vapor transmission cell 10. The flow of the sweep gas and test gas from source 38 which is exhausted through exhaust tubes 28 and 36 is maintained at a sufficient flow rate to provide the upper compartment 18 with a substantially constant dry volume of sweep gas, and the lower compartment 20 with substantially constant saturated volume of test gas. Such flow rate is established by flowmeters 46 and 48 and valves 54 and 56 respectively connected to the sweep gas exhaust tube 28 and the test gas exhaust tube 36. Thus a steady state condition is maintained to encourage an even flow of water vapor through the test film.

The water vapor that permeates through the film and into the upper compartment is swept into the sweep gas exhaust tube and into contact with detector element 44. The detector measures the amount of water vapor flowing from the upper compartment per unit of time and transmits that information to a recorder or meter. This information is then converted into grams of water transmitted per 24 hours per square meters of film separating the upper and lower compartments, to thus coincide with the standard systems of measurement.

The test gas inlet tube is provided with a bypass line 50 and appropriate shutoff valves 52 to permit gas from source 38 to flow through tube 32 directly into the lower compartment 20 in a substantially dry state. Thus a reading can be made on the meter before the saturated gas is introduced into the system to ascertain the correct base reading to the instruments. The saturator can then be put back into the system without exposing the system to the atmosphere. The magnitude of water vapor transmission as reflected by the instruments can thus be measured exactly. This feature is important when the film permeability is very low and the small difference between a zero reading and the base reading is a substantial percentage of the actual permeability.

The saturator is essentially a means of saturating a gas stream with water vapor by passing it through liquid water. A suitable unit for both the gas drying cell and the detector is a phosphorous pentoxide electrolytic cell. This cell quantitatively electrolyzes water vapor to hydrogen and oxygen, thus completely drying the gas stream passing through it. In the sensing unit of the detector the electrolysis current is directly convertible to water content, and can be measured to determine the values of water vapor transmission through the sample film.

As noted in FIG. 2, the abutting edges of the upper and lower sections of the water vapor transmission cell are provided with mating ridges to effect a gastight seal when the sample film is clamped therebetween. Thus the cell is tightly sealed against any gas leakage to the outside of the cell and except for the permeability transfer through the film itself is sealed against any leakage between the compartments.

Pressure differences in the compartments may cause deformation of the test film which in turn can cause erroneous test results. Therefore, it is desirable to provide a means for detecting the occurrence of such pressure differences and to further provide a means for adjusting the pressure in one or both of said compartments to equalize the pressures. The pressure differences can be detected as for example by connecting a differential monometer between the inlet or outlet tubes of the respective compartments. Due to the flow resistance produced by the gas drying cell in tube 24 the greater pressure will normally build up in the test gas compartment 20 of the illustrated apparatus. A throttling valve can thus be provided in the inlet tube 32 of said compartment 20 to reduce the pressure therein as required for equalization of the pressures.

It is understood that numerous variations from the described system are possible without departing from my invention. Thus, the saturator can be removed and test gas inlet tube can be connected to a source of any desired test gas to determine the permeability of the film to other gases. Depending on the test processes desired, the drying element 40 may be removed, and an appropriate detecting element may replace that which is described, e.g. a flame ionization detector may be incorporated in certain instances. Furthermore, various other methods of recording can be employed as well as other means for balancing the pressures between the compartments.

What I claim is as follows:

1. Apparatus for measuring film permeability using flowing gas streams including a gastight cell comprised of a pair of sections adapted to clamp a sheet of film material therebetween and thereby partition the cell into first and second compartments, means to connect the first compartment with a sweep gas source, and means to connect the second compartment with a test gas source, and exhaust outlet in each of said compartments and a test gas detecting element in communication with the exhaust of said first compartment to determine the amount of test gas present in the exhaust of the first compartment per unit of time.

2. Apparatus for measuring film permeability as defined in claim 1 wherein the sweep gas is a dry gas and the test gas is water saturated, and the detector element comprises means for determining the amount of water vapor present in the exhaust of the first compartment per unit of time to measure the water vapor permeability of the test film.

3. An apparatus as defined in claim 2 wherein the test gas is rendered water saturated by a saturator element at the test gas source, and means to bypass said saturator element to enable introduction into the second chamber unsaturated gas for establishing a base reading on the detector.

4. An apparatus as defined in claim 1 wherein said first and second sections of the cell have abutting flanges that include mated ridges that firmly grip the test film positioned therebetween to tightly seal the compartments against atmospheric leakage, and means for measuring and adjusting the gas pressure within the compartments.

5. A process for measuring the permeability of films using flowing gas streams which includes passing a sweep gas over one side of sheet of film material while simultaneously passing a test gas over the other side of the sheet, and measuring the amount of test gas present in the spent sweep gas per unit of time to determine the rate at which the test gas permeates through the film.

6. A process for measuring the permeability of films using flowing gas streams to water vapor which includes passing a dry gas over one side of a sheet of film material while simultaneously passing a saturated gas over the other side of the sheet, and measuring the water content in the spent sweep gas per unit of time to determine the rate at which the water vapor permeates through the film.

7. The process according to claim 6, wherein said dry gas is obtained by passing a gas over phosphorous pentoxide to absorb moisture therefrom and subjecting said absorbed moisture to electrolysis.

8. The process according to claim 7, wherein said water content in said spent sweep gas is absorbed by phosphorous pentoxide, the resulting absorbed moisture is electrolyzed, and the resulting electrolysis current is measured to determine said rate at which said water vapor permeates through said film.

9. Apparatus for measuring the moisture vapor transmission characteristic of material comprising:
first and second members forming first and second closed chambers adapted to be separated by a layer of the material disposed with a surface in each chamber, each of said chambers having an inlet and an outlet passage,
a first gas supply means for providing a constant flow of gas at a predetermined temperature and pressure and with a predetermined moisture content,
means connecting said first supply means to said inlet passage of the first chamber to provide a constant flow of gas through said first chamber and across one surface of the material,
a second gas supply means for providing a constant flow of gas at a predetermined temperature and pressure and with a predetermined moisture content, the gas of said second supply means having a moisture content lower than the gas of said first supply means,
means connecting said second supply means to said inlet passage of the second chamber to provide a constant flow of gas through said second chamber and across another surface of the material, and
means connected to said outlet passage of said second chamber for indicating the gain in moisture level of the gas as it passes through said second chamber and gains the moisture which has passed through the material to provide an indication of the moisture permeability of the material.

10. Apparatus for measuring the moisture vapor transmission characteristic of material comprising:
first and second members forming first and second closed chambers adapted to be separated by a layer of the material disposed with a surface in each chamber, each of said chambers having an inlet and an outlet passage,
a first gas supply means for providing a constant flow of gas at a predetermined temperature and pressure and with a predetermined moisture content,
means connecting said first supply means to said inlet passage of the first chamber to provide a constant flow of gas through said first chamber and across one surface of the material,
a second gas supply means for providing a constant flow of gas at a predetermined temperature and pressure and with a predetermined moisture content, the gas of said second supply means having a moisture content lower than the gas of the first supply means,
means connecting said second supply means to said inlet passage of the second chamber to provide a constant flow of gas through said second chamber and across another surface of the material, and
means connected to said outlet passage of said second chamber for indicating the gain in moisture level of the gas which has passed through said second chamber and gained the moisture which has passed through the material to provide an indication of the moisture permeability of the material.

11. Apparatus for measuring the permeability of material to a test gas, comprising:
first and second members forming first and second closed chambers adapted to be separated by a layer of the material disposed with a surface in each chamber, each of said chambers having an inlet and an outlet passage.
a first gas supply means for providing a constant flow of a first gas at a predetermined temperature and pressure and with a predetermined content of said test gas,
means connecting said first supply means to said inlet passage of the first chamber to provide a constant flow of gas through said first chamber and across one surface of the material, a second gas supply means for providing a constant flow of gas at a predetermined temperature and pressure and with a predetermined content of said test gas, the content of said test gas provided by said second supply means being lower than that of said test gas provided by the first supply means, means connecting said second supply means to said inlet passage of the second chamber to provide a constant flow of gas through said second chamber and across another surface of the material, and means connected to said outlet passage of said second chamber for indicating the content of test gas in the gas which has passed through said second chamber and gained test gas which has passed through the material to provide an indication of the permeability of the material to said test gas.

12. Apparatus for measuring the moisture vapor transmission of a film of material, comprising:

first and second members forming first and second closed chambers adapted to be separated by said film with a surface in each chamber, each of said chambers having an inlet and an outlet passage;

a first gas supply means for providing a first gas with a predetermined moisture content;

means connecting said first gas supply means to said inlet passage of said first chamber;

a second gas supply means for providing a second gas;

drying means connected to said second gas supply means to dry said second gas and provide a dry gas having a moisture content lower than that of said first gas;

means connecting said drying means to said inlet passage of said second chamber; and means connected to said outlet passage of said second chamber for indicating the gain in moisture level of the gas which has passed through said second chamber and gained the moisture which has passed through said film to provide an indication of the moisture permeability of the material.

13. Apparatus according to claim 12, wherein said drying means comprises a phosphorous pentoxide electrolytic cell.

14. Apparatus according to claim 12, wherein said means for indicating comprises a phosphorous pentoxide electrolytic cell and means for measuring the electrolysis current of the latter cell.

15. Apparatus according to claim 12, wherein said first gas supply means comprises a water saturator for saturating a carrier gas with water to provide said first gas.

16. Apparatus according to claim 12 further comprising bypass means for passing said dry gas to said inlet passage of said first chamber.